United States Patent [19]

Miller et al.

[11] Patent Number: 4,684,079
[45] Date of Patent: Aug. 4, 1987

[54] INFLATABLE EVACUATION DEVICE

[75] Inventors: Ralph A. Miller, Monmouth Beach; Harry B. Whitney, Colts Neck, both of N.J.

[73] Assignee: The Garrett Corporation, Los Angeles, Calif.

[21] Appl. No.: 809,088

[22] Filed: Dec. 13, 1985

[51] Int. Cl.⁴ .............................................. B64D 25/00
[52] U.S. Cl. .................................. 244/137.2; 244/905; 193/25 B
[58] Field of Search ......... 244/DIG. 2, 137 P, 137 R; 182/48; 193/25 B

[56] References Cited

U.S. PATENT DOCUMENTS

| 3,463,915 | 8/1969 | Day | 244/DIG. 2 |
|---|---|---|---|
| 3,470,991 | 10/1969 | Holcombe | 244/DIG. 2 |
| 3,595,357 | 7/1971 | McLander . | |
| 3,692,144 | 9/1972 | Summer et al. . | |
| 3,712,417 | 1/1973 | Chacko et al. | 182/48 |
| 3,845,920 | 11/1974 | Satterfield et al. | 244/137 P |
| 3,973,645 | 8/1976 | Dix et al. | 182/48 |
| 4,018,321 | 4/1977 | Fisher | 182/48 |
| 4,333,546 | 6/1982 | Fisher | 182/48 |

Primary Examiner—Jeffrey V. Nase
Assistant Examiner—Lynn M. Fiorito
Attorney, Agent, or Firm—Albert J. Miller

[57] ABSTRACT

An inflatable evacuation device to simultaneously evacuate from both an overwing aircraft exit and an aircraft exit aft of the trailing edge of the aircraft wing.

4 Claims, 5 Drawing Figures

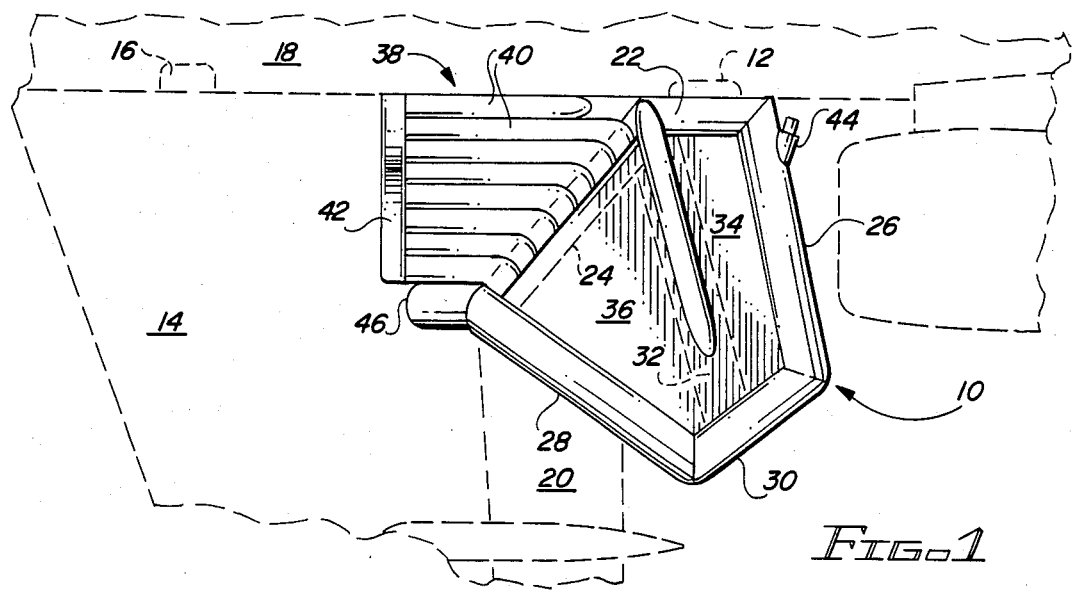
FIG. 1
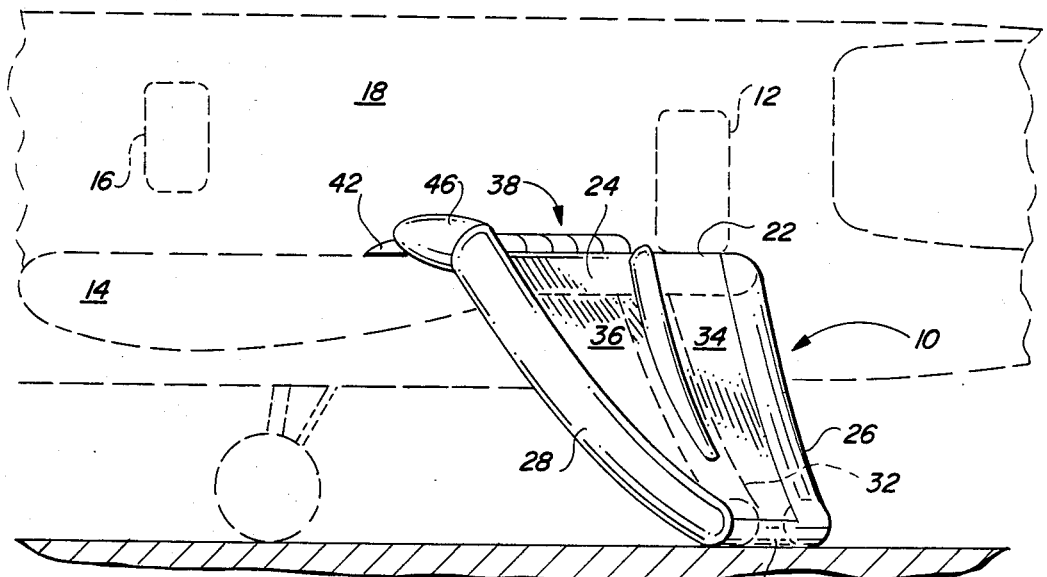
FIG. 2
FIG. 3
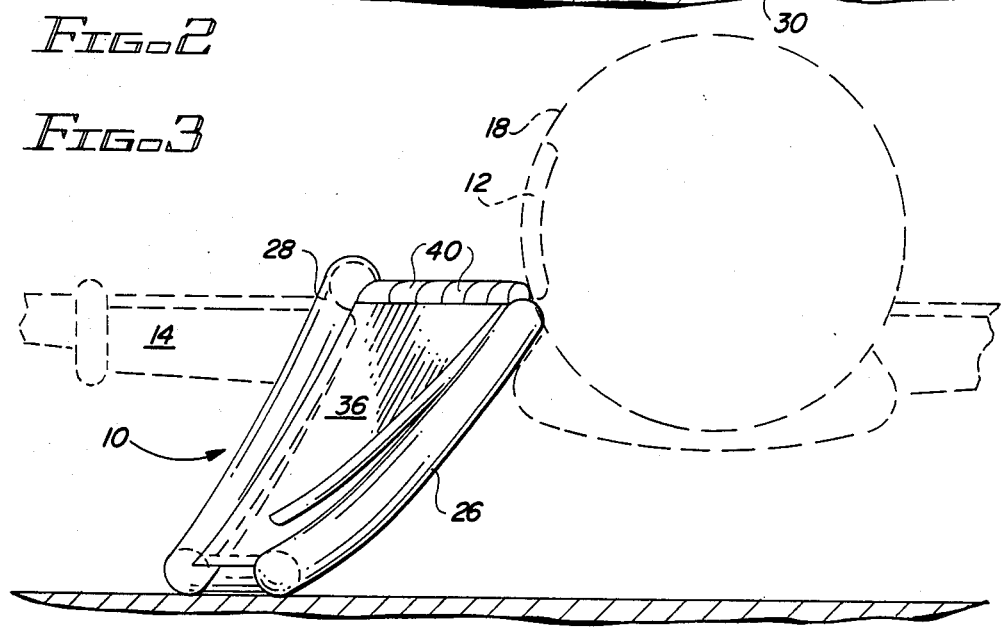

INFLATABLE EVACUATION DEVICE

BACKGROUND OF THE INVENTION

Inflatable evacuation slides and/or slides rafts are now installed on substantially all passenger-carrying aircraft to provide a means for rapid evacuation from the aircraft in the event of an emergency. These inflatable evacuation devices are normally folded in an uninflated condition into a pack requiring a minimum of space in the interior of the aircraft door or immediately adjacent thereto. With the aircraft door closed a girt bar extending from the inflatable evacuation slide is connected to brackets on the floor inside the aircraft doorway such that in the event of an emergency it is only necessary to open the aircraft door to automatically deploy the slide. With the door opening, the girt bar will pull the evacuation slide from its container thereby allowing the slide to fall through the now open doorway. Subsequently, the evacuation slide is rapidly inflated and is then ready for the evacuation of passengers within a very short period of time following the opening of the door.

In the normal situation the aircraft door is situated so that the inflatable evacuation slide can extend directly outward therefrom with the bottom of the slide resting on a lower surface to provide a straight-line sliding surface from the aircraft door to the lower surface. An example of this type of slide can be found in U.S. Pat. No. 3,595,357.

There are some situations, however, in which the aircraft door or emergency exit opens out onto the aircraft wing. In this case, the evacuees may walk out onto the wing and slide off the trailing edge, or a walkway may be provided on the wing with an inflatable evacuation slide extending from the walkway to the ground. An example of this type of walkway and evacuation slide can be found in U.S. Pat. No. 3,692,144. Where, however, there is not an unobstructed path from the aircraft door to the lower surface upon which the aircraft is at rest or the aircraft door does not open out onto the wing surface, neither of the two abovementioned types of slides can be utilized. An example of this situation would be a door located a short distance aft from where the aircraft wing is attached to the aircraft fuselage. Since the wing normally extends backward at an acute angle from the aircraft fuselage, the wing surface would normally interfere with the deployment of an evacuation slide from a door such as this. U.S. Pat. No. 3,973,645 is an example of an evacuation slide useful in this situation.

If, however, there is an inflatable evacuation slide extending from an aircraft exit aft of the trailing edge of the aircraft wing, such as in U.S. Pat. No. 3,973,645, the slide would prevent a walkway on the wing and an inflatable evacuation slide extending from the walkway to the ground. Also, with such a slide, the evacuees would have to proceed farther out on the wing surface in order to jump to the ground from the trailing edge thereof in order to avoid the slide.

In all of the above cases, the evacuation device, be it slide or ramp/slide, is stored at the elevated egress for which it is intended to be used. In other words, a single evacuation device can be used at only a single elevated egress and thus does provide evacuation from any other egress at the same time.

SUMMARY OF THE INVENTION

The present invention is directed to an inflatable evacuation device for simultaneous evacuation of two aircraft exits, specifically an aircraft door just aft of the aircraft wing and an exit or exits over the aircraft wing. The device is generally pentagonal in shape with an evacuation lane provided from the door exit and a generally parallel evacuation lane from the trailing edge of the aircraft wing. An inflatable ramp extends forward from the wing evacuation lane toward the window exit(s) over the wing.

BRIEF DESCRIPTION OF THE DRAWINGS

FIG. 1 is a top plan view of the inflated evacuation device of the present invention.

FIG. 2 is a side elevation view of the inflated evacuation device of the present invention.

FIG. 3 is a front view of the inflated evacuation device of the present invention.

DESCRIPTION OF THE EMBODIMENTS

Figure 4:
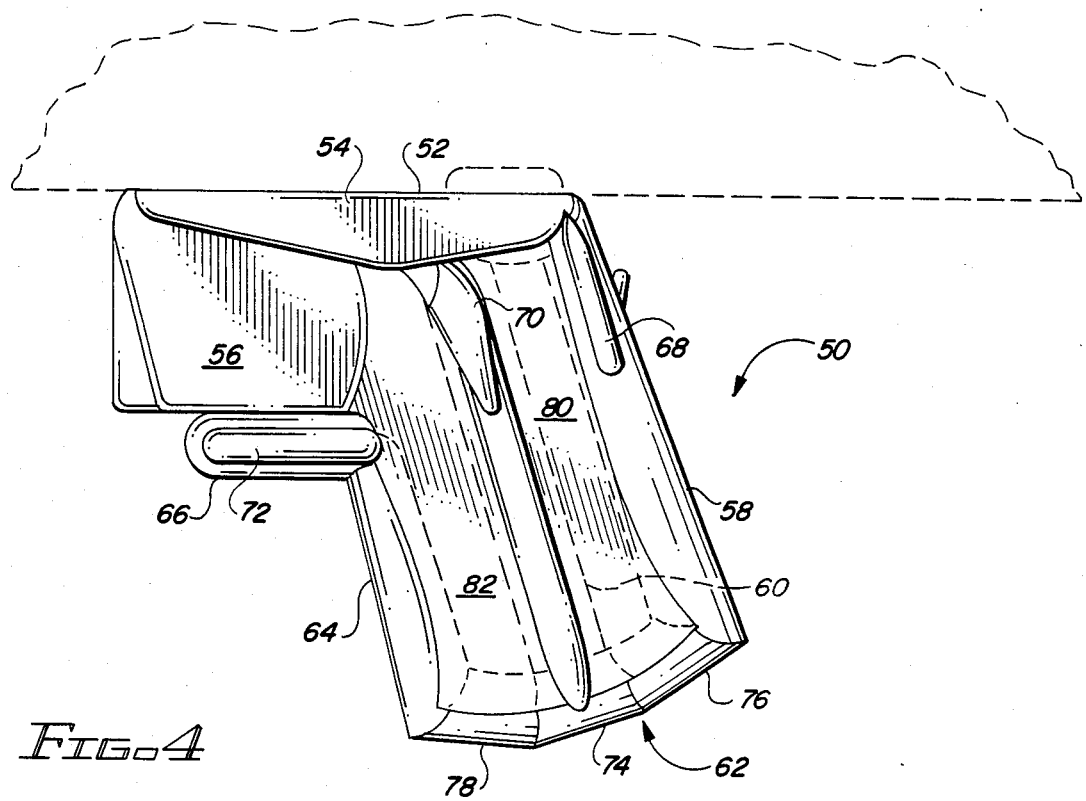
FIG. 4 is a top plan view of an alternate inflated evacuation device of the present invention.

The evacuation device 10 of the present invention is designed to provide evacuation paths for both an aircraft door 12 and one or more window exits 16 which open onto the aircraft wing 14. The aircraft door 12 from the aircraft fuselage 18 is situated just aft of the trailing edge 20 of the aircraft wing 14.

As illustrated in FIGS. 1-3, the device 10 is generally pentagonal or five-sided in shape and comprises an inflatable tube or beam which extends around the entire periphery of the device. The peripheral beam includes horizontal sill beam 22 at the base of the aircraft door 12 and a wing beam 24 generally extending forward and outward from the forward end of the sill beam 22. Also, inboard longitudinal beam 26 extends to the ground from the aft end of the sill beam 22 while an outboard longitudinal beam 28 extends to the ground from the forward outboard end of the wing beam 24. A ground beam 30 joins the lower or ground ends of the inboard longitudinal beam 26 and outboard longitudinal beam 28. A lane divider longitudinal beam 32 extends from the junction of the sill beam 22 and wing beam 24 to the midspan of the ground beam 30.

An inboard sliding surface 34 generally extends between the inboard longitudinal beam 26 and lane divider longitudinal beam 32 from the sill beam 22 to the inboard portion of the ground beam 30. Likewise, an outboard sliding surface 36 generally extends between the lane divider longitudinal beam 32 and the outboard longitudinal beam 28 from the wing beam 24 to the outboard portion of the ground beam 30.

Extending forward from the wing beam 24 towards the wing exit 16 is an inflatable ramp 38 comprising a plurality of mattress-type parallel chambers 40 inflatably communicating with the wing beam 24. A tapered ramp threshold 42 extends from the wing surface to the ramp 38 to facilitate entry from the wing 14 onto the ramp 38.

The inflatable evacuation device 10 is stored in an uninflated, folded condition in a packboard disposed in the aircraft door. Also stored in the packboard is a compressed air source from which the device 10 is inflated through the aspirator 44 in the inboard longitudinal beam 26. The sill beam 22 is attached to the base of the aircraft doorway 12 by means of a girt which extends to the floor of the aircraft fuselage where it is held by a girt bar and brackets in a conventional manner.

When the aircraft door is opened, the packboard is pulled from the door since the girt is held to the fuselage floor at the base of the aircraft doorway. The packboard will fall from the open doorway and the evacuation device will fall free and be automatically inflated from the compressed gas source. A deployment system, which may include restraints during the inflation process, will insure that the device 10 inflates outwardly from the aircraft and that the ramp 38 inflates over the wing 14. The forward end of the wing beam 24 will come to rest on the wing 14 and be supported thereby. A forward extension 46 of the outward longitudinal beam 28 which extends generally parallel with the ramp 38 will facilitate the proper deployment thereof.

Figure 5:
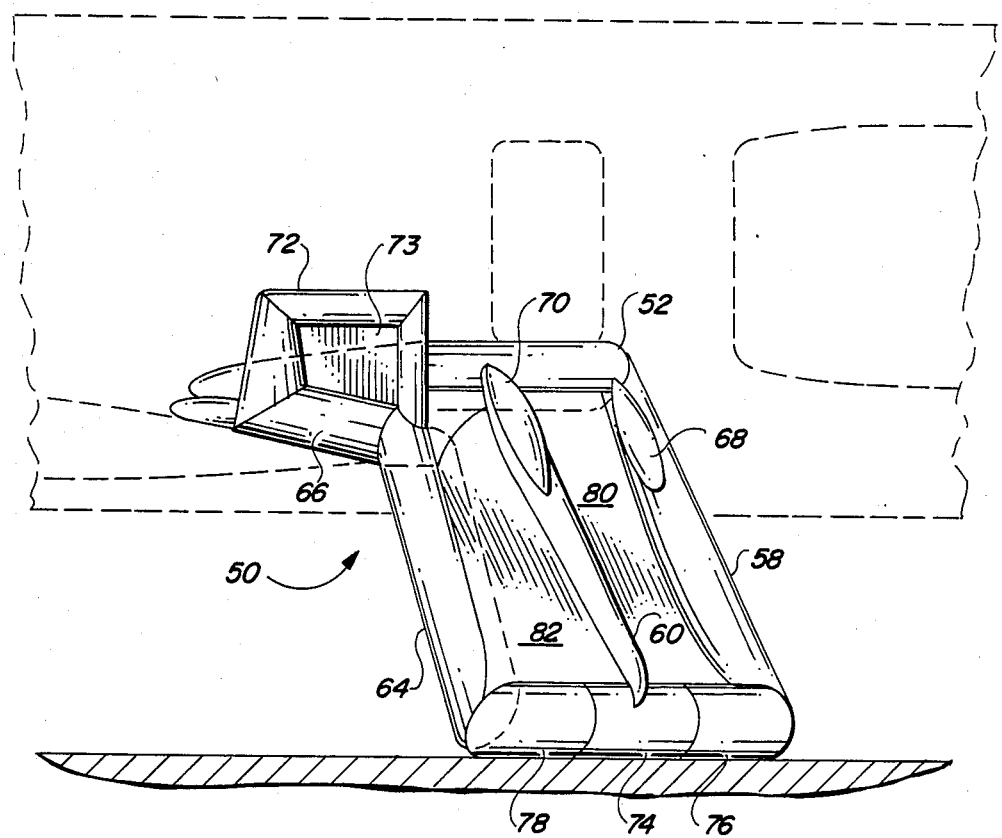
FIG. 5 is a side elevation view of the alternate inflated evacuation device of the present invention.

In the alternate embodiment of the present invention illustrated in FIGS. 4 and 5, the inflatable evacuation device 50 includes sill beam 52 having a forward tapered section 54 which extends along the inboard edge of the ramp 56. The inboard longitudinal beam 58 extends from the sill beam 52 to the ground beam 62. The lane divider longitudinal beam 60 extends from the intersection of the sill beam 52 and ramp 56. The outboard longitudinal beam 64 extends from the ground beam 62 to the ramp 56 and includes a forward section 66 which extends along the outboard edge of the ramp 56. Both the inboard longitudinal beam 58 and lane divider beam 60 may include inflatable bumpers 68 and 70 respectively near the upper ends thereof. An inflatable handrail 72 including membrane 73 may be provided on the outboard side of the ramp 56 to provide evacuee containment and guidance aft of the threshold of the outboard sliding surface.

In this alternate embodiment, the lane divider longitudinal beam 60 extends downward farther than either the inboard or outboard longitudinal beams 58, 64. Thus the ground beam 62 includes a mid span section 74 generally perpendicular to the lane divider longitudinal beam 60 and an angled inboard section 76 extending to the inboard longitudinal section 58 plus an oppositely angled outboard section 78 extending to the outboard longitudinal section 64. The inboard sliding surface 80 extends between the inboard longitudinal beam 58 and lane divider beam 60 from the sill beam 52 to the ground beam 62. The outboard sliding surface 82 extends between the lane divider longitudinal beam 60 and the outboard longitudinal beam 64 from the ramp 56 to the ground beam 62.

The present invention provides an inflatable evacuation device which include an evacuation path or lane from an aircraft doorway and an evacuation path or lane from an aircraft window exit or exits over the aircraft wing. These two paths are included in the same inflatable structure but are positively separated so as not to interfere with each other. The entire device is mounted at the aircraft doorway.

In both embodiments of the present invention, there can be simultaneous evacuation of two elevated aircraft egresses, i.e. from one egress located aft of the aircraft wing and another egress or egresses over the aircraft wing. The evacuation device is disposed at and inflated from the aircraft egress aft of the aircraft wing and separate sliding surfaces are provided for evacuees from the egress over the aircraft wing. The two sliding surfaces are separated by a longitudinal inflatable beam. Over wing evacuees have a defined safe path to the ground including a separate sliding surface.

While specific embodiments of the invention have been illustrated and described, it is understood that these are provided by way of example only and that the invention is to be construed as being limited only by the proper scope of the following claims.

What we claim is:

1. Inflatable slide apparatus for simultaneous evacuation from two elevated egresses of an aircraft to a lower surface upon which the aircraft is at rest where one egress is located aft of an aircraft wing and the other egress is over the aircraft wing, said apparatus comprising:

a fluid distensible beam structure having a first beam section disposed adjacent the elevated egress aft of the aircraft wing and operably connected to said egress and having a forward end and an aft end, a second beam section extending from the forward end of the first beam section to over the trailing edge of the aircraft wing, three generally parallel longitudinal beam sections, with the first longitudinal beam section extending from the aft end of the first beam section, the second longitudinal beam section extending from the intersection of the first and second beam sections, and the third longitudinal beam section extending from the outward end of the second beam section, all of the parallel longitudinal beam sections extending to the lower surface, and a sixth beam section on the lower surface joining the lower ends of the three longitudinal beam sections;

a first sliding surface extending between the first two of said three longitudinal beam sections from said first beam section to said sixth beam section;

a second sliding surface extending between the second and third of said three longitudinal beam sections from said second beam section to said sixth beam section;

a fluid distensible ramp extending forward from said second beam section on the aircraft wing towards the egress over the aircraft wing; and means to deploy the fluid distensible beam structure and ramp from the egress aft of the aircraft wing.

2. Inflatable slide apparatus for simultaneous evacuation from two elevated egresses of an aircraft to a lower surface upon which the aircraft is at rest where one egress is located aft of an aircraft wing and the other egress is over the aircraft wing, said apparatus comprising:

a fluid distensible beam structure having a first beam section disposed adjacent the elevated egress aft of the aircraft wing and operably connected to said egress, a ramp extending forward from said first beam section towards the egress over the aircraft wing, three generally parallel longitudinal beam sections with an individual longitudinal beam section extending, respectively, from the aft end of the first beam section, the intersection of the first beam section and ramp, and the outward end of the ramp, and with all of the longitudinal beam sections extending to the lower surface, and a fifth beam section on the lower surface joining the lower ends of the three longitudinal beam sections;

a first sliding surface extending between the first two of said three longitudinal beam sections from said first beam section to said fifth beam section;

a second sliding surface extending between the second and third of said three longitudinal beam sections from said ramp to said fifth beam section; and means to deploy the fluid distensible beam structure and ramp from the egress aft of the aircraft wing.

3. The inflatable slide apparatus of claim 2 wherein the longitudinal beam section extending from the intersection of the first beam section and ramp extends downward farther than the inboard or outboard longitudinal beam sections and the fifth beam section on the lower surface joining the lower ends of the three longitudinal beam sections includes a midspan section at the lower end of the farthest downward extending longitudinal beam section and generally perpendicular thereto, an inboard section angled from the midspan section to the lower end of the inboard longitudinal beam section and an outboard section oppositely angled from the other end of the midspan section to the lower end of the outboard longitudinal beam section.

4. Inflatable slide apparatus for simultaneous evacuation from two elevated egresses of an aircraft to a lower surface upon which the aircraft is at rest where one egress is located aft of an aircraft wing and the other egress is over the aircraft wing, said apparatus comprising:

a fluid distensible member of a generally elongate configuration when fully inflated, disposed in an uninflated, folded configuration at the elevated egress aft of the aircraft wing with one end secured thereto, said member comprising a generally pentagonal shaped fluid distensible beam having two generally parallel sliding surfaces operably affixed thereto and six beam sections in fluid communication with each other, including, when inflated, a sill beam section disposed at the elevated egress aft of the aircraft wing and operably secured thereto, a wing beam section extending outward from the forward end of the sill beam section, a bottom beam section disposed on the lower surface upon which the aircraft is at rest, an inboard longitudinal beam section extending from the aft end of the sill beam section to the inboard end of the bottom beam section, an outboard longitudinal beam section extending from the outward end of the wing beam section to the outboard end of the bottom beam section, and a sliding surface divider longitudinal beam section extending directly from the junction of the sill beam section and the wing beam section to the midspan of the bottom beam section to separate the two generally parallel sliding surfaces.

* * * * *